(12) United States Patent
Sjöberg et al.

(10) Patent No.: US 9,487,245 B2
(45) Date of Patent: Nov. 8, 2016

(54) FRAME CONFIGURATION FOR VEHICLES

(71) Applicants: SCANIA CV AB, Södertälje (SE); SSAB AB, Stockholm (SE)

(72) Inventors: Michael Sjöberg, Södertälje (SE); Håkan Larsson, Finnerödja (SE); Anders Isaksson, Falun (SE)

(73) Assignees: SCANIA CV AB (SE); SSAB AB (SE)

( * ) Notice: Subject to any disclaimer, the term of this patent is extended or adjusted under 35 U.S.C. 154(b) by 0 days.

(21) Appl. No.: 14/647,271

(22) PCT Filed: Nov. 25, 2013

(86) PCT No.: PCT/SE2013/051380
§ 371 (c)(1),
(2) Date: May 26, 2015

(87) PCT Pub. No.: WO2014/084777
PCT Pub. Date: Jun. 5, 2014

(65) Prior Publication Data
US 2015/0321701 A1    Nov. 12, 2015

(30) Foreign Application Priority Data

Nov. 27, 2012    (SE) ...................................... 1251333

(51) Int. Cl.
*B62D 27/00* (2006.01)
*B62D 27/02* (2006.01)
*B62D 63/08* (2006.01)
*B62D 21/02* (2006.01)
(Continued)

(52) U.S. Cl.
CPC ............. *B62D 27/023* (2013.01); *B62D 21/02* (2013.01); *B62D 21/12* (2013.01); *B62D 21/20* (2013.01); *B62D 27/065* (2013.01); *B62D 53/061* (2013.01); *B62D 63/08* (2013.01)

(58) Field of Classification Search
CPC .... B62D 27/023; B62D 21/02; B62D 21/12; B62D 27/065; B62D 53/061; B62D 63/08
USPC ............................ 296/204, 203.01; 280/785
See application file for complete search history.

(56) References Cited

U.S. PATENT DOCUMENTS

2003/0178834 A1    9/2003  Grimm et al.
2009/0174171 A1*   7/2009  Maiorana ............... B62D 21/20
                                                            280/423.1

FOREIGN PATENT DOCUMENTS

DE              4213130 A1    12/1992
DE     20 2005 009101 U1       2/2006
(Continued)

OTHER PUBLICATIONS

International Search Report dated Mar. 4, 2014 issued in corresponding International patent application No. PCT/SE2013/051380.
(Continued)

*Primary Examiner* — Joseph D Pape
(74) *Attorney, Agent, or Firm* — Ostrolenk Faber LLP

(57) ABSTRACT

A frame configuration (I; II; III) for a vehicle (1) includes a forward part (10; 210) and a rear part (30; 130, 160; 230), the forward and rear parts are united by a first connection part (50; 150; 250) arranged between the forward and rear parts (10; 210, 30; 130, 160; 230) including a forward interface (G1) for connection with the forward part and a rear interface (G2) for connection with the rear part. Also a vehicle with the frame configuration is disclosed.

16 Claims, 3 Drawing Sheets

(51) Int. Cl.
*B62D 21/12* (2006.01)
*B62D 27/06* (2006.01)
*B62D 53/06* (2006.01)
*B62D 21/20* (2006.01)

(56) References Cited

FOREIGN PATENT DOCUMENTS

| EP | 1 506 914 A2 | 2/2005 |
| EP | 1 997 717 | 12/2008 |
| WO | WO 98/08728 A1 | 3/1998 |
| WO | WO 2005/012065 A1 | 2/2005 |

OTHER PUBLICATIONS

International Preliminary Report on Patentability dated Feb. 12, 2015 issued in corresponding International patent application No. PCT/SE2013/051380.

* cited by examiner

FRAME CONFIGURATION FOR VEHICLES

CROSS-REFERENCE TO RELATED APPLICATIONS

The present application is a 35 U.S.C. §§371 national phase conversion of PCT/SE2013/051380, filed Nov. 25, 2013, which claims priority of Swedish Patent Application No. 1251333-9, filed Nov. 25, 2012, the contents of which are incorporated by reference herein. The PCT International Application was published in the English language.

TECHNICAL AREA

The invention relates to a frame configuration for a vehicle. The invention relates also to a vehicle with the frame configuration.

BACKGROUND

The conventional way of manufacturing a trailer frame for a trailer for a truck today is to create an I-beam by welding together webs and flanges of the beam that have the dimensions required to achieve the desired strength of the frame. It is common that transverse beams, axle fittings and other components are also welded to the frame. One problem is that welding significantly reduces the fatigue strength of the frame.

EP1997717 discloses a trailer frame in which a sub-base comprises a forward and a rear beam that are joined together by screws.

OBJECT OF THE INVENTION

One object of the present invention is to achieve a frame configuration for a vehicle with high strength that can be adapted and thus increases its flexibility and cost efficiency.

SUMMARY OF THE INVENTION

This and other objects are achieved by means of a frame configuration and a vehicle of the type described in the introduction, and that furthermore demonstrate the distinctive features. Preferred embodiments of the frame configuration and the vehicle are also disclosed.

The objects are achieved with a frame configuration for vehicles comprising a forward part and a rear part, wherein the forward and rear parts are connected, where the frame configuration comprises a first connection part arranged between the parts and including a forward interface for connection with the forward part and a rear interface for connection with the rear part.

This provides a simple adaptable frame configuration wherein the connection part or a front and rear connection part facilitates connection of the forward and rear parts with freely chosen length, and that consequently can be adapted to different conditions. The connection parts have forward and rear interfaces to make possible a simple adaptation for a transition between different heights for adaptation to specific needs, depending on the type of vehicle. Where the vehicle comprises a trailer, the connection part with forward and rear interfaces makes possible a simple adaptation for a transition between different heights providing adaptation to drawing vehicles in which a lower height of the forward frame part is normally required. The interfaces make possible the use of essentially straight beams, which makes the manufacture and transport easier, and consequently leads to a cost efficient frame configuration. Furthermore, efficient absorption of tension in the connection part is made possible. In addition, the use of screw joints or riveted joints in order to reduce to a minimum the influence on material is made easier. Consequently, improved material fatigue strength is provided, in that the interfaces and connection with the forward and rear parts can be simply configured for example by at least one of screw and riveted joints.

Furthermore, the first connection part of the frame configuration includes a transition between the parts from a first height at the forward part to a second height at the rear part. This makes adaptation possible without either one or both of the parts needing to be configured with such a transition, and they can be manufactured with essentially straight beam elements. Where the vehicle includes a trailer, the second height normally exceeds the first height, whereby adaptation for connection to the drawing vehicle of the truck is made possible without the forward part needing to be configured with such a transition. It can be instead manufactured with essentially straight beam elements.

Furthermore, the forward and rear parts of the frame configuration each includes two parallel beam elements that run longitudinally along the trailer. This provides a stable and strong frame configuration in which transverse beams for further improved strength and stability can be advantageously connected between the beam elements. The forward part includes also a first forward beam element and a second forward beam element that runs essentially parallel to the first forward beam element. The rear part further includes a first rear beam element and a second rear beam element that runs essentially parallel to the first rear beam element.

According to one embodiment of the frame configuration, the forward interface is adapted to the first height and the rear interface is adapted to the second height. In this way the forward and rear parts can be manufactured with essentially straight beam elements.

According to one embodiment of the frame configuration, the beam elements of at least one of the forward and rear parts are essentially straight. This provides a cost efficient frame configuration in that the straight beam elements are relatively simple to manufacture and in that transport is made easier through simple packing.

According to one embodiment of the frame configuration, the beam elements of at least one of the forward and rear parts have a U-configuration when viewed in cross-section. The frame configuration of trucks are normally manufactured by means of beam elements with a U-configuration where the web of the U-shaped beams is used as an interface for truck components, such as axles including axle suspensions, wheel guards and guard stays, rear lights with suspensions, side skirts, rear underride protection, side underride protection. Adaptation of the frame to existing interfaces in such a truck is made possible in this way, which makes it possible to achieve another vehicle such as a trailer consisting mainly of such truck components, and that makes possible the cost efficient manufacture of a vehicle such as a trailer.

According to one embodiment of the frame configuration, at least one of the forward and rear interfaces includes at least one of a screw joint and a riveted joint for the connection. The properties of materials are not influenced by either the screw joint or the riveted joint, or both the screw joint and the riveted joint, to the same extent as they would be influenced by welding, which makes it possible to make the frame configuration lighter while maintaining its strength, or to make it with greater strength while maintaining its weight, in comparison with the use of I-beams joined by welding.

According to one embodiment, the frame configuration comprises furthermore at least one further connection part of a type that essentially corresponds to the first connection part. This makes it possible in this way to further adapt the frame configuration as required, where a further transition between at least one of the forward and rear parts makes it possible to adapt the heights of the parts, to reduce, for example, the height where the specific height is not required due to the strength or as interface for the connection of vehicle components, or both, and thus to reduce the amount of material and in this way to make the frame configuration lighter for more energy-efficient driving by means of the truck.

According to one embodiment of the frame configuration, the beam elements of at least one of the forward and rear parts are formed by bending. The properties of materials are not influenced in this way to the same extent as they are influenced by welding, which makes it possible to make the frame configuration lighter while maintaining its strength, or to make it with greater strength while maintaining its weight, in contrast with the use of I-beams joined by welding.

According to one embodiment of the frame configuration, the web part of the beam elements of at least one of the forward and rear parts includes a longitudinal grooved reinforcement. The strength is in this way further improved, such that the frame configuration can be made lighter while maintaining its strength, or made with greater strength while maintaining its weight, in comparison with the use of I-beams joined by welding.

According to one embodiment the frame configuration is adapted for trailers for trucks where the forward part is arranged for connection to a draw vehicle of the truck whereby the frame configuration is arranged for the support of a load. The connection part with forward and rear interfaces makes possible in this way for a simple adaptation for a transition between different heights for adaptation to drawing vehicles of the truck in which a lower height of the forward frame part is normally required.

BRIEF DESCRIPTION OF DRAWINGS

The present invention will be better understood with reference to the following detailed description read together with the attached drawings, where the same reference numbers refer to the same parts throughout the several views, and where:

FIG. 5b illustrates schematically an exploded view from above of the frame configuration in FIG. 5a;

DESCRIPTION OF EMBODIMENTS

The term "vehicle" is used here to denote any vehicle that comprises a frame configuration arranged to support at least one of load and vehicle components. "Vehicle" according to one embodiment includes a trailer at a truck where the frame configuration is arranged to be connected to a draw vehicle of the truck and to support load. "Vehicle" includes according to one embodiment a truck in which the frame configuration is arranged to support the propulsion of the truck, the cabin, and supplementary structures with which the truck is equipped. "Vehicle" includes according to one embodiment a bus, where the frame configuration is arranged to support the propulsion of the bus and supplementary structures with which the bus is equipped.

The term "truck" is here used to denote a vehicle comprising a trailer and a vehicle to draw the trailer, where the vehicle to draw the trailer may be constituted by a truck or a drawing vehicle.

Figure 1:
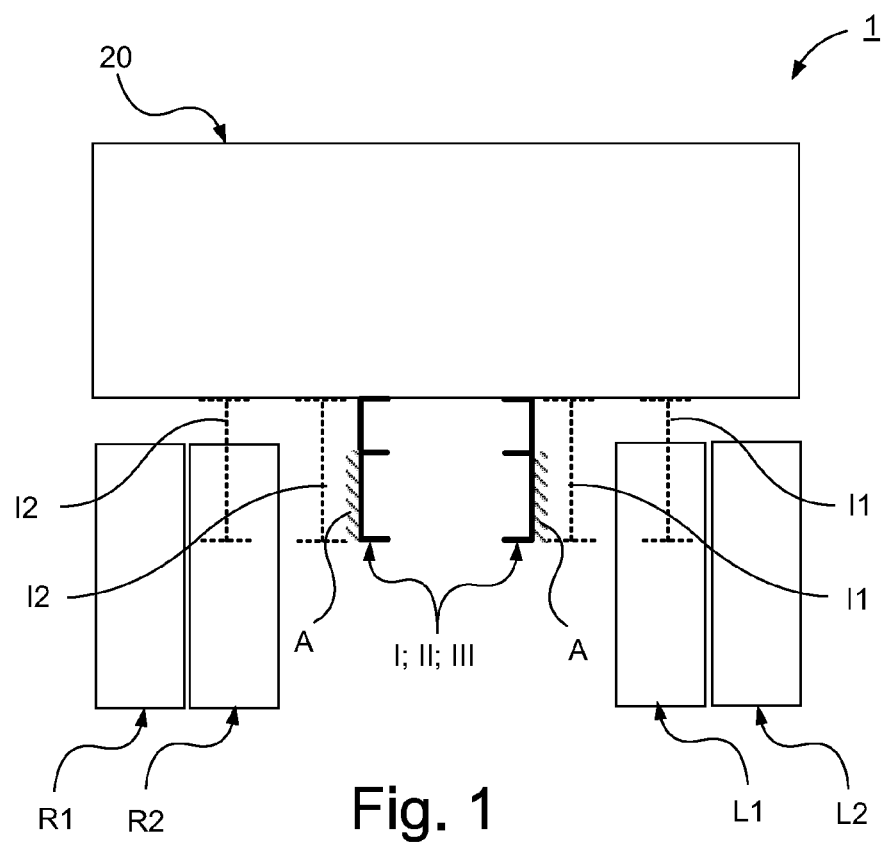
FIG. 1 illustrates schematically a view from the front of a trailer according to one embodiment of the present invention.
Figure 2:
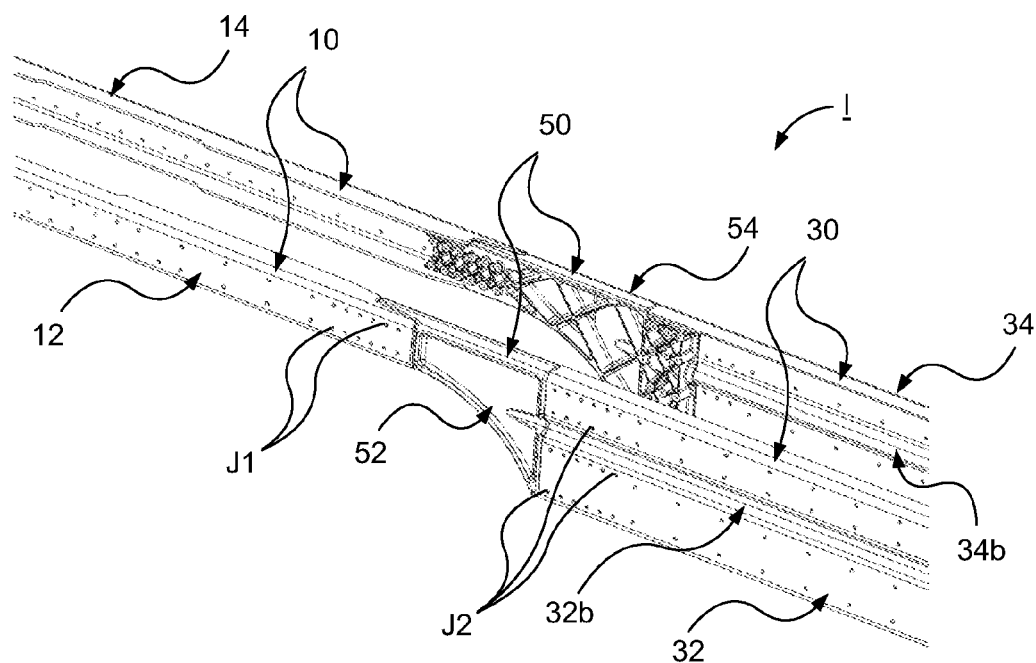
FIG. 2 illustrates schematically a perspective view of one part of a frame configuration according to one embodiment of the present invention.
Figure 3:
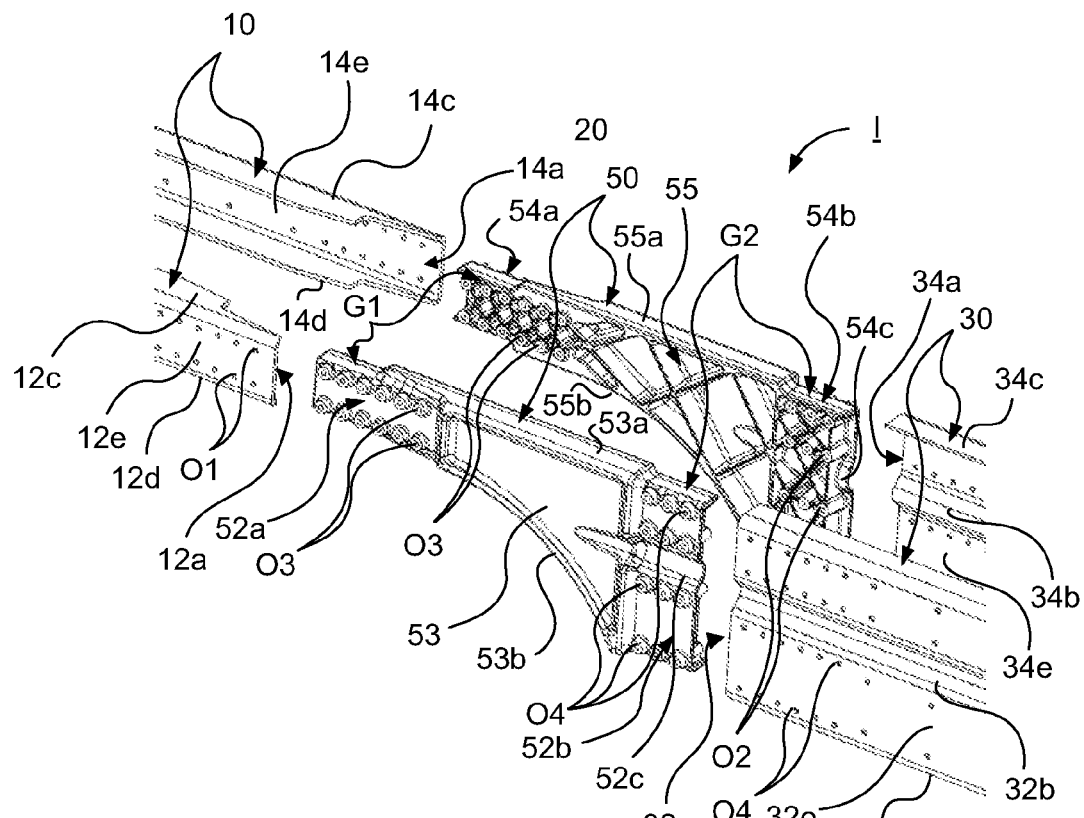
FIG. 3 illustrates schematically an exploded perspective view of a part of the frame configuration in FIG. 2.

FIG. 1 illustrates schematically a view from the front of a vehicle 1 according to one embodiment of the present invention. The vehicle 1 is comprised according to this variant by a trailer 1 at a truck. The vehicle 1 may comprise any suitable vehicle, such as a trailer, a truck, a bus or a car. The vehicle 1 comprises a frame configuration I; II; III according to the present invention.

The frame configuration I for the trailer 1 has beam elements with a U-configuration seen in cross-section with outwardly directed web parts, described in more detail with reference to FIGS. 2-5, with a surface area. One area A at the web part is advantageously used as interface for truck components such as axles, including axle suspensions, wheel guards and guard stays, rear lights with suspensions, side skirts, rear underride protection, side underride protection, whereby the frame configuration consequently is adapted according to one variant to existing interfaces for a truck with corresponding such beam elements, which makes possible cost efficient manufacture of the trailer 1.

A further advantage of using such a frame configuration with beam elements with a U-configuration for trailers is that in contrast to conventional frame configurations for trailers in which the beam elements I1, I2 with an I-configuration have been adapted according to whether the vehicle has double wheel pairs L1, L2, R1, R2 or single wheel pairs L1, L2 where the beam elements I1, I2 for single wheel pairs L1, R1 are arranged internally in connection with the single wheel pairs L1, R1 and where the beam elements I1, I2 for double wheel pairs L1, L2, R1, R2 are arranged internally in connection with the inner wheel pair L2, R2 of the double wheel pairs L1, L2, R1, R2, where the beam elements I1, I2 with an I-configuration according to conventional frame configurations for trailers is illustrated in FIG. 1.

Figure 4:
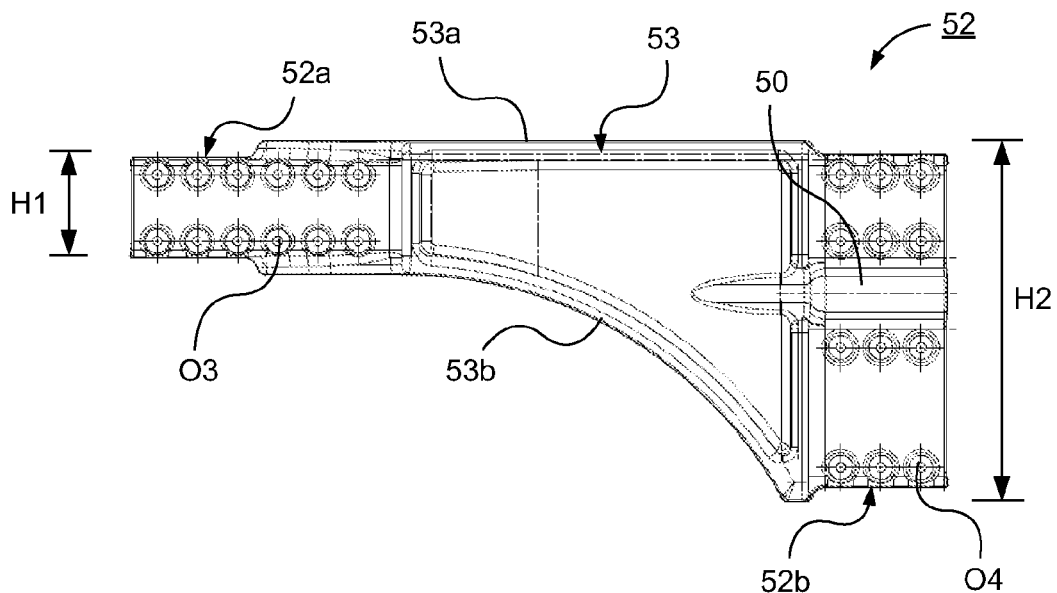
FIG. 4 illustrates schematically a connection unit of the frame configuration in FIG. 2.
Figure 5A:
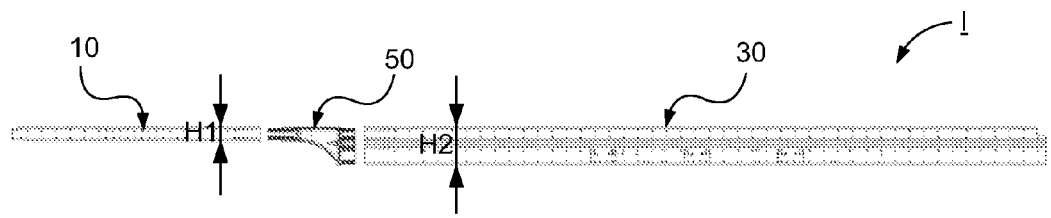
FIG. 5a illustrates schematically an exploded side view of the frame configuration in FIG. 2.
Figure 5B:
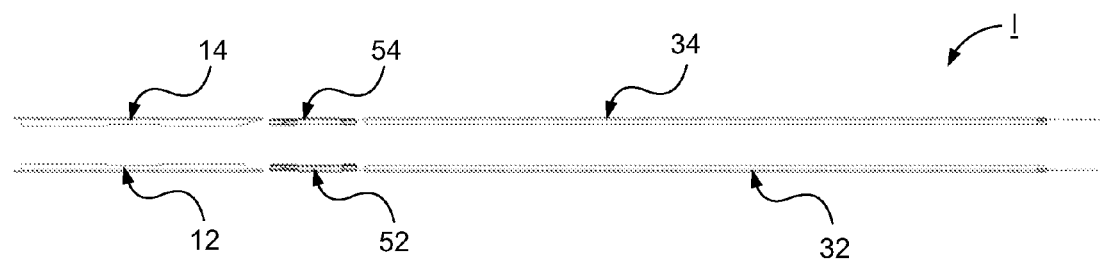

FIGS. 2-3 and 5a-b illustrate schematically different views of a frame configuration I according to one embodiment of the present invention, and FIG. 4 shows a side view of a connection unit 52 of a connection part at the frame configuration I. The frame configuration I according to this embodiment is configured for a trailer for a truck.

The frame configuration I comprises a forward part 10 arranged for connection to a draw vehicle of the truck, whereby the frame configuration is arranged for the support of load.

The frame configuration I comprises a connection part 50 arranged between the forward and rear parts 10, 30. The connection part 50 includes a forward interface G1 for connection to the forward part 10 and a rear interface G2 for connection with the rear part 30.

The connection part 50 includes a transition between the 10, 30 (FIGS. 5a and 5b) from a first height H1 at the forward part 10 to a second height H2 at the rear part 30, where the second height H2 exceeds the first height H1.

The forward interface G1 at the connection part 50 is adapted to the first height H1 and the rear interface G2 is adapted to the second height H2.

The forward and rear parts 10, 30 each include two parallel beam elements, respectively 12, 14, and 32, 34 that run longitudinally along the vehicle. The forward part 10 includes consequently a first forward beam element 12 and a second forward beam element 14 that runs essentially parallel to the first forward beam element 12. The rear part 30 includes consequently a first rear beam element 32 and a second rear beam element 34 that runs essentially parallel with the first rear beam element 32.

The connection part 50 includes a first connection unit 52 arranged between the first forward beam element 12 and the first rear beam element 32. The first connection unit 50 includes a first forward interface 52a for connection with a first interface 12a at the first forward beam element 12 and a first rear interface 52b for connection with a first rear interface 32a at the first rear beam element 32.

The connection part 50 includes a second connection unit 54 arranged between the second forward beam element 14 and the second rear beam element 34. The second connection unit 54 includes a second forward interface 54a for connection with a second interface 14a at the second forward beam element 14 and a second rear interface 54b for connection with a second interface 34a at the second rear beam element 34.

The first connection unit 52 includes a first intermediate part 53 between the forward interface 52a and the rear interface 52b. The second connection unit 54 includes a second intermediate part 55 between the forward interface 54a and the rear interface 54b.

Each of the intermediate parts 53, 55 constitutes reinforcement at the transition between the relevant forward and rear beam elements and is consequently arranged to absorb forces when the frame configuration is placed under load.

Each of the intermediate parts 53, 55 has according to this embodiment an essentially plane upper part 53a, 55a and an essentially bowed lower part 53b, 55b arranged to run from the relevant rear interface 52b, 54b and obliquely upwards to the relevant forward interface 52a, 54a. In this way, the efficient absorption of tensions in the same is made possible.

Through the connection part 50 with connection units 52, 54 and interfaces 52a, 54a, 52b, 54b there is obtained a simple adaptable frame configuration in that the connection part facilitates connection of forward and rear parts with freely chosen length, and that consequently can be adapted to different conditions.

The connection part 50 with forward and rear interfaces G1, G2 at the frame configuration I for the trailer makes possible the simple adaptation for a transition between different heights for adaptation to drawing vehicles for trucks, where a lower height of the forward frame part is normally required. The interfaces 52a, 54a, 52b, 54b make possible the use of essentially straight beams, which makes the manufacture and transport easier, and consequently leads to a cost efficient frame configuration I.

The beam elements 12, 14, 32, 34 of the forward and rear parts 10, 30 of the frame configuration I are essentially straight. There is in this way obtained a cost efficient frame configuration in that the straight beam elements are relatively simple to manufacture and in that transport is made easier through simple packing.

The beam elements 12, 14, 32, 34 of the forward and rear parts 10, 30 of the frame configuration I have a U-configuration in cross-section, i.e. each beam element 12, 14, 32, 34 is comprised of a U-beam, where the beam elements 12, 14, 32, 34 are arranged relative to each other in such a manner that the flanges at a beam element 12, 32 are turned to face the flanges at an opposite beam element 14, 34 that runs parallel to it.

The beam elements 12, 14, 32, 34 with a U-configuration thus have an upper flange 12c, 14c, 32c, 34c with an upper beam surface, a lower flange 12d, 14d, 32d and a hidden lower flange at beam element 34 with a lower beam surface, and a web 12e, 14e, 32e, 34e that has an outer beam surface. The web 12e, 14e, 32e, 34e at each of the beam elements 12, 14, 32, 34 thus constitutes an outer part, which has an outer plane that is essentially perpendicular to the longitudinal and transverse direction of the vehicle.

The web 32e, 34e at the rear beam elements 32, 34 at the rear part 30 include a longitudinal grooved reinforcement 32b, 34b. The strength is in this way further improved, such that the frame configuration I can be made lighter while maintaining its strength, or made with greater strength while maintaining its weight. In a corresponding manner, the relevant connection unit 52, 54 at the connection part has a grooved reinforcement 52c, 54c arranged in the rear interface 52b, 54b to fit with a forward part of the grooved reinforcement at the relevant rear beam element 32, 34.

The interfaces 12a, 14a, 32a, 34a at the relevant beam element 12, 14, 32, 34 at the forward and rear part 10, 30 have a set of penetrating holes O1, O2, and the interfaces 52a, 54a, 52b, 54b at the relevant connection unit 52, 54 of the connection part 50 have a set of penetrating holes O3, O4, where the penetrating holes O1, O2, O3, O4 are arranged such that the beam elements 12, 14, 32, 34 and the connection unit 52, 54 can be united by means of fixing elements in the form of at least one of screw joints and riveted joints.

The interfaces G1, G2 at the connection part include consequently at least one of a screw joint J1, J2 and a riveted joint J1, J2 for connection of the forward and rear parts 10, 30. The interfaces 12a, 14a, 32a, 34a at the beam elements 12, 14, 32, 34 at the forward and rear parts 10, 30 are united with the interfaces 52a, 54a, 52b, 54b of the relevant connection unit 52, 54 at the connection part 50 by means of at least one of screw joints and riveted joints. The properties of materials are not influenced by either the screw joint or the riveted joint, or both the screw joint and the riveted joint, to the same extent as by welding, which makes it possible to make the frame configuration lighter while maintaining its strength, or to make it with greater strength while maintaining its weight, in comparison with the use of I-beams joined by welding.

The beam elements 12, 14, 32, 34 at the forward and rear part 10, 30 are, according to one embodiment, formed by bending. The properties of materials are not influenced in this way to the same extent as for welding, which makes it possible to make the frame configuration lighter while maintaining its strength, or to make it with greater strength while maintaining its weight, in comparison with the use of I-beams joined by welding.

Figure 6:
FIG. 6 illustrates schematically an exploded side view of a frame configuration according to one embodiment of the present invention.

FIG. 6 illustrates schematically an exploded side view of a frame configuration 11 according to another embodiment of the present invention. The frame configuration II differs from the embodiment in FIGS. 2-5*a*-*b* essentially through it having, in addition to a first connection part 50, a second connection part 150 of a corresponding type as the first connection part 50 for connection between the rear part 130, which here constitutes an intermediate part, and a rearmost part 160.

The second connection part 150 includes a transition between the intermediate piece 130 and the rearmost part 160 from a first height of the intermediate part 130 to a second height of the rearmost part 160, where the first height exceeds the second height. The height at the rear of the frame configuration III is in this way reduced, which may be appropriate for a vehicle in which a specific height at the rear part of the vehicle is not required for reasons of at least one of strength and as an interface for the connection of vehicle components. The amount of material is in this way reduced whereby the frame configuration becomes lighter, for more energy-efficient transport by means of the vehicle.

Figure 7:
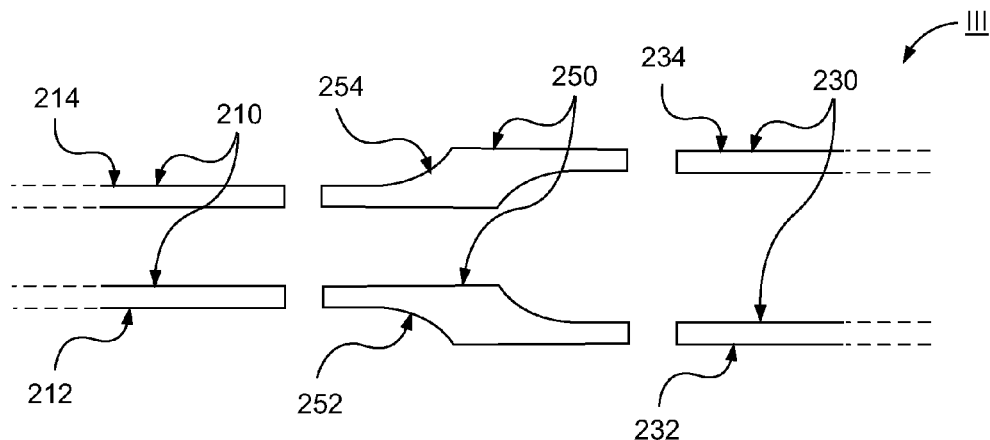
FIG. 7 illustrates schematically an exploded view from above of one part of a frame configuration according to one embodiment of the present invention.

FIG. 7 illustrates schematically a view from above of one part of a frame configuration III according to one embodiment of the present invention. The frame configuration III according to the embodiment shown in FIG. 7 differs from the frame configurations I; II according to the embodiments shown in FIGS. 2-6 essentially through the design of the connection part 250, i.e. the design of the relevant connection unit 252, 254 of the connection part 250.

According to this embodiment the relevant connection unit 252, 254 of the connection part 250 has a transition between the forward beam element 212, 214 at the forward part 210 and the rear beam element 232, 234 at the rear part 230 such that the distance between the forward parallel beam elements 212, 214 differs from the distance between the rear parallel beam elements 232, 234.

Such a design of the frame configuration III can be applied at a motor vehicle such as a truck in which such a transition can be adapted for components of the propulsion such as the motor of the motor vehicle. The connection unit 250 has, according to one variant, a corresponding transition in height as the transition according to the embodiments in FIGS. 2-6.

The connection unit 250 may have the same or different heights behind and in front of the interface, and the same or different widths behind and in front of the interface.

The frame configuration may be adapted to any suitable vehicle, whereby the heights of the forward and rear interfaces at the connection part are adapted for the particular vehicle and for components at the vehicle and, where relevant, connected vehicles.

The connection part may have any suitable design for adaptation to the particular vehicle.

FIG. 6 shows the use of two connection parts. It is possible to envisage also more than two connection parts combined in a suitable manner for adaptation to a particular vehicle, where the connection parts have different designs at different positions along the frame configuration.

Above, the connection unit of the connection part of the frame configuration I has been shown in the embodiment for the frame configuration shown in FIGS. 2-5*a*-*b* with the forward interface for adaptation of the height of the forward beam element and the rear interface for adaptation of the height of the rear beam element, where the height of the relevant forward beam element and consequently the height of the forward interface at the relevant connection unit is lower than the height of the relevant rear beam element and consequently the height of the rear interface at the relevant connection unit.

According to one variant the height of the relevant forward beam element and consequently the height of the forward interface at the relevant connection unit exceeds the height of the relevant rear beam element and consequently the height of the rear interface at the relevant connection unit. Such a design of the frame configuration can be applied at a motor vehicle such as a truck in which such a transition can be adapted for components of the propulsion such as the motor of the motor vehicle.

Above, the forward and rear interfaces embodiment of the frame configuration I shown in FIGS. 2-5*a*-*b* at the relevant connection unit at the connection part have been adapted to receive and unite beam elements with U-configurations, i.e. U-beams.

According to one variant, the forward interface of the relevant connection unit has been configured to receive and unite beam elements with another configuration than a U-configuration in order to, according to one variant that is suitable for trailers in which the height of the forward part, i.e. the height of the parallel forward beam elements, that are to be connected to a drawing vehicle, according to one variant a turning disc at a drawing vehicle, are preferably as low as possible, make possible a lower height of the beam elements with retained strength, such as two opposing U-beams forming an I-configuration or similar.

Forward and rear beam elements with a U-configuration have been described above in connection with the embodiment described with reference to FIGS. 2-5*a*-*b*. According to an alternative variant at least one of the forward and rear beam elements has an S-configuration and is consequently constituted by S-beam elements. In this case the interface at the relevant connection unit is consequently configured to receive and unite beam elements with an S-configuration. The advantage is obtained when using beam elements with an S-configuration that the plane for the load can be made broader.

Various frame configurations has been described above in which the forward and rear parts each include two parallel beam elements that run longitudinally along the trailer.

According to an alternative embodiment, at least one of the forward and rear parts includes a frame construction in the form of one or several frames in which the connection part is arranged to unite the frame construction through the interface at the connection part.

According to a further alternative embodiment, at least one of the forward and rear parts includes a sandwich construction in which the connection part is arranged to unite the sandwich construction through the interface at the connection part.

Connection units in which the relevant intermediate part has an essentially plane upper part and an essentially bowed lower part have been described above in association with the embodiment described with reference to FIGS. 2-5*a*-*b*. According to an alternative embodiment, the intermediate part at the relevant connection unit at the connection part has an essentially plane lower part and an essentially bowed upper part.

The description above of the preferred embodiments of the present invention has been given for the purposes of illustration and description. It is not intended to be exhaustive or to limit the invention to the variants that have been described. Many modifications and variations will be obvious for one skilled in the arts. The embodiments have been selected and described in order to best describe the principles of the invention and its practical applications, and thus to make it possible for one skilled in the arts to understand the invention for various embodiments and with the various modifications that are appropriate for the intended use.

The invention claimed is:

1. A frame configuration for a vehicle comprising:
   a forward part and a rear part, which are united;
   a first connection part between the forward and rear parts;
   the first connection part including a forward interface for connection with the forward part and a rear interface for connection with the rear part the first connection part includes a transition between the forward and rear parts which transitions from a first height at the forward part to a second height at the rear part;
   each of the forward and rear parts includes two parallel, transversely spaced apart beam elements that extend longitudinally along the vehicle, the forward part includes as the beam elements a first forward beam element and a second forward beam element that runs essentially parallel to the first forward beam element, and the rear part includes as the beam elements a first rear beam element and a second rear beam element that runs essentially parallel to the first rear beam element; and
   the second height exceeds the first height, and the forward interface at the connection part is adapted to the first height at the forward part and the rear interface is adapted to the second height at the rear part.

2. The frame configuration according to claim 1, wherein the beam elements of at least one of the forward and rear parts are essentially straight.

3. The frame configuration according to claim 1, wherein the beam elements of at least one of the forward and rear parts have a U-configuration along the beam elements in a transverse cross-section.

4. The frame configuration according to claim 1, wherein at least one of the forward and rear interfaces includes at least one of a screw joint and a riveted joint as the connection respectively to the forward and rear parts.

5. The frame configuration according to claim 1, further comprising the first connection part includes at least one further connection part that essentially corresponds to the first connection part and is connected to the rear part.

6. The frame configuration according to claim 1, wherein the beam elements of at least one of the forward and rear parts has been formed by bending.

7. The frame configuration according to claim 1, wherein the beam elements of at least one of the said forward and rear parts has a web part of the beam element which includes a longitudinal grooved reinforcement.

8. The frame configuration according to claim 1, wherein the frame configuration is adapted for trailers used with and for trucks, wherein the forward part is arranged for connection to a draw vehicle of a truck, whereby the frame configuration is configured for support of a load.

9. A vehicle comprising a frame configuration according to claim 1.

10. The vehicle according to claim 9, wherein the vehicle comprises a trailer used with a truck, wherein the forward part is arranged for connection to a draw vehicle of a truck, whereby the frame configuration is configured for the support of a load.

11. The vehicle according to claim 9, wherein the vehicle comprises a truck and the frame configuration is configured to support vehicle components of the vehicle.

12. The frame configuration according to claim 1, wherein the transition is shaped to provide a gradual transition between the forward and the rear parts.

13. The frame configuration according to claim 1, wherein the connection part forward interface is configured to connect with the forward part; and
   at least one further connection part includes the rearward interface configured to connect with the rear part.

14. The frame configuration according to claim 1, further comprising a reinforcement at the transition between each forward and respective rear beam element, the reinforcement configured to absorb forces on the frame configuration from loads.

15. The frame configuration according to claim 1, wherein the connections at the interfaces are configured to enable the forward and the rear interfaces to be positioned longitudinally of the frame configuration at various locations for adapting for differences in the parts then being connected at the interfaces.

16. The frame configuration according to claim 1, wherein the first connection part and the interfaces thereof is configured to permit an adjustment of the heights of the forward and rear beam elements with respect to each other.

* * * * *